US012587637B2

(12) United States Patent
Chen et al.

(10) Patent No.: US 12,587,637 B2
(45) Date of Patent: Mar. 24, 2026

(54) WARPED MOTION COMPENSATION WITH EXPLICITLY SIGNALED EXTENDED ROTATIONS

(71) Applicant: Google LLC, Mountain View, CA (US)

(72) Inventors: Yue Chen, Kirkland, WA (US); Yu Wang, Kirkland, WA (US); Hui Su, Sunnyvale, CA (US); Debargha Mukherjee, Cupertino, CA (US); Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/576,733

(22) PCT Filed: Jul. 15, 2021

(86) PCT No.: PCT/US2021/041824
§ 371 (c)(1),
(2) Date: Jan. 4, 2024

(87) PCT Pub. No.: WO2023/287417
PCT Pub. Date: Jan. 19, 2023

(65) Prior Publication Data
US 2024/0388690 A1 Nov. 21, 2024

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/52* (2014.11)

(58) Field of Classification Search
CPC .. H04N 19/105; H04N 19/139; H04N 19/176; H04N 19/52; H04N 19/527; H04N 19/53
See application file for complete search history.

(56) References Cited

U.S. PATENT DOCUMENTS

| 2005/0094852 A1* | 5/2005 | Kumar | ................. H04N 19/527 375/E7.114 |
| 2007/0013710 A1* | 1/2007 | Higgins | ............... G06V 10/754 345/581 |

(Continued)

FOREIGN PATENT DOCUMENTS

WO 2017/087751 A1 5/2017

OTHER PUBLICATIONS

International Search Report and Written Opinion of International Application No. PCT/US2021/041824, mailed Mar. 21, 2022, 23 pgs.

(Continued)

*Primary Examiner* — Anner Holder
(74) *Attorney, Agent, or Firm* — Young Basile Hanlon & MacFarlane, P.C.

(57) ABSTRACT

Video coding using warped motion compensation is described. Extended rotations for the warped motion compensation can be explicitly signaled. For example, motion parameters for predicting the current block and a rotation angle can be decoded. A warping matrix is obtained using the motion parameters and the rotation angle, and a prediction block is obtained by projecting the current block to a quadrilateral in a reference frame. Also described is determining a prediction model of the current block and obtaining a prediction block by projecting the current block to a quadrilateral in a reference frame. Determining the prediction model can include determining whether to predict the current block using a motion vector, a local warping model, or a global motion model, obtaining motion parameters of the prediction model, decoding a rotation angle, and obtaining a warping matrix using the motion parameters and the rotation angle.

20 Claims, 10 Drawing Sheets

(51) Int. Cl.
  H04N 19/176 (2014.01)
  H04N 19/52 (2014.01)

(56) References Cited

U.S. PATENT DOCUMENTS

| | | | |
|---|---|---|---|
| 2012/0201303 A1* | 8/2012 | Yang | H04N 19/147 |
| | | | 375/240.14 |
| 2017/0013279 A1* | 1/2017 | Puri | H04N 19/85 |
| 2017/0238011 A1 | 8/2017 | Pettersson et al. | |
| 2019/0349598 A1* | 11/2019 | Aminlou | H04N 19/105 |

OTHER PUBLICATIONS

Jean Bégaint et al., "Region-Based Models for Motion Compensation in Video Compression", 2018 IEEE Picture Coding Symposium (PCS), Jun. 2018 (San Francisco), pp. 154-158.

Hirohisa Jozawa et al., "Two-Stage Motion Compensation Using Adaptive Global MC and Local Affine MC", IEEE Transaction on Circuits and Systems for Video Technology, vol. 7, No. 1, Feb. 1997, pp. 75-85.

Yuwen He et al., "Efficient Coding With Adaptive Motion Models", Picture Coding Symposium, Apr. 23, 2003 (Saint Malo), 5 pgs.

Alexei Efros, "Image Warping", 15-463: Computational Photography, CMU, Fall 2006, Retrieved from the Internet: URL: http://graphics.cs.cmu.edu/courses/15-463/200_fall/www/Lectures/warping.pdf, 27 pgs.

C. Stiller et al., "Estimating Motion in Image Sequences—A Tutorial on Modeling and Computation of 2D Motion", IEEE Signal Processing Magazine, Jul. 1, 1999, pp. 70-91.

* cited by examiner

800

802

DETERMINE PROJECTION SAMPLES FOR PREDICTING A WARPED MOTION OF A CURRENT BLOCK TO BE ENCODED OR DECODED BASED ON NEIGHBOR BLOCKS

804

DETERMINE PARAMETERS OF A PROJECTION MODEL BASED ON THE PROJECTION SAMPLES

806

GENERATE A PREDICTION BLOCK BY PROJECTING PIXELS OF THE CURRENT BLOCK TO A REFERENCE FRAME USING THE PROJECTION MODEL PARAMETERS

902

OBTAIN MOTION PARAMETERS FOR CODING THE
CURRENT BLOCK

904

OBTAIN A ROTATION ANGLE TO APPLY TO THE
PREDICTION MODEL

906

OBTAIN A WARPING MATRIX USING THE MOTION
PARAMETERS AND THE ROTATION ANGLE

908

OBTAIN A PREDICTION BLOCK USING THE WARPING
MATRIX

1000

1002

DECODE MOTION PARAMETERS FOR PREDICTING A CURRENT BLOCK

1004

DECODE A ROTATION ANGLE

1006

OBTAIN A WARPING MATRIX USING THE MOTION PARAMETERS AND THE ROTATION ANGLE

1008

OBTAIN A PREDICTION BLOCK BY PROJECTING THE CURRENT BLOCK TO A QUADRILATERAL IN A REFERENCE FRAME

WARPED MOTION COMPENSATION WITH EXPLICITLY SIGNALED EXTENDED ROTATIONS

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

This disclosure relates generally to encoding and decoding video data and more particularly relates to encoding and decoding blocks of video frames using explicitly signaled extended rotations.

A first aspect is a method for decoding a current block. The method includes decoding, from a compressed bitstream, motion parameters for predicting the current block; decoding, from the compressed bitstream, a rotation angle; obtaining a warping matrix using the motion parameters and the rotation angle; and obtaining a prediction block by projecting the current block to a quadrilateral in a reference frame.

A second aspect is a computing device for decoding a current block of a current frame. The computing device includes a processor that is configured to determine a prediction model of the current block; and obtain a prediction block by projecting the current block to a quadrilateral in a reference frame. The processor is configured to determine the prediction model by steps to determine whether to predict the current block using a motion vector, a local warping model, or a global motion model; obtain motion parameters of the prediction model; decode, from a compressed bitstream, a rotation angle; obtain a warping matrix using the motion parameters and the rotation angle.

A third aspect is a method of coding a current block. The method includes obtaining motion parameters for coding the current block; obtaining a rotation angle to apply to the motion parameters; obtaining a warping matrix using the motion parameters and the rotation angle; and obtaining a prediction block using the warping matrix.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
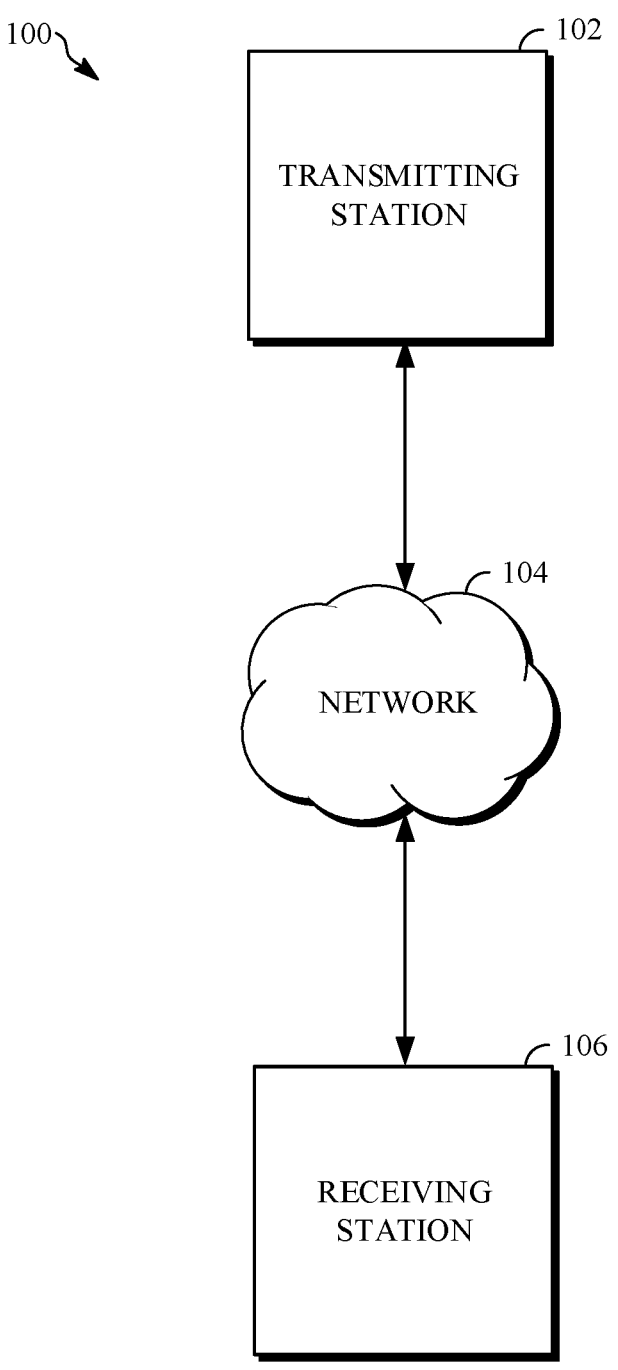
FIG. 1 is a schematic of a video encoding and decoding system.

Video compression schemes may include breaking respective images, or frames, into smaller portions, such as blocks, and generating an output bitstream using techniques to limit the information included for respective blocks in the output. An encoded bitstream can be decoded to re-create the source images from the limited information.

Typical video compression and decompression schemes use motion compensation that assumes purely translational motion between or within blocks to predict the motion within blocks of frames to be encoded or decoded. A motion vector can be used to find (e.g., identify, locate, select, etc.) a prediction of a coding block in a reference frame. The position of the current block (e.g., the position $(x_0, y_0)$ of a top-left pixel or the position $(x_c, y_c)$ of a center pixel), may be first mapped in the reference frame. The position in the reference frame can then be displaced by the motion vector to identify a target reference block. The motion vector can have sub-pixel precision (e.g., ⅛ pixel precision).

However, not all motion within a block can be efficiently described using translational motion models with respect to a reference block of a reference frame. For example, some motion may be warped motion that includes scaling, shearing, or rotating motion, either alone or with translational motion. Warped motion may be global or may be local. To illustrate, a block may include warped motion that may be modeled as an affine transformation. The affine transformation model can project a pixel at (x, y) of the current block to a prediction pixel at (x', y') in a reference frame through formula (1).

$$\begin{bmatrix} x' \\ y' \end{bmatrix} = \begin{bmatrix} a & b & c \\ d & e & f \end{bmatrix} \begin{bmatrix} x \\ y \\ 1 \end{bmatrix} \tag{1}$$

In formula (1), the tuple (c, f) corresponds to a conventional motion vector that can be used in a translational model. The parameters a and e can be used to control the scaling factors in the vertical and horizontal axes, and in conjunction with the parameters b and d decide (e.g., determine, set, etc.) a rotation angle. While affine transformation models are used as illustrative examples herein, the warping model can generally be a homographic model.

In some instances, the warped motion can be attributed, for example, to camera shake, panning, or zooming and may be applicable to all, or at least most, blocks of a current frame. As such, the motion is "global" to a frame. The global motion can itself be a translational motion. Respective global models (referred to herein as a "global motion models") can be associated with at least some of the reference frames available for coding a current frame. A global motion model can capture frame level scaling and rotation. As such, a global motion model can be used to primarily focus on the settings of rigid motion over an entire frame. The global motion model can be obtained using any known technique for obtaining a global motion model.

A set of global motion parameters can be computed between a current frame being encoded and a reference frame. The parameters ascertained as 'good' in terms of the warping error (obtained by warping an entire reference frame to the current frame and computing the error) can be communicated in the bitstream for that reference. If no good global parameters are found, the only global motion option available for blocks in that frame coded with the corresponding reference will be zero motion.

In some instances, objects in frames may have independent motions or may be distributed at different depths. In such cases, a global motion model may not appropriately describe the motion in blocks including such objects or portions thereof. As further described below, a prediction block of a current block can be obtained by warping a reference frame according to a locally adapted warping model (referred to herein as a local warping model). By a locally adapted warping model, this disclosure means a local motion model whose homographic parameters can be estimated from motion of one or more reconstructed neighboring blocks of the current block.

The local warping model can be obtained using any known technique for obtaining a local warping model. In an example, and as further described below, warped motion compensation can be used to generate a prediction block for encoding or decoding individual blocks of a video frame. Projection samples usable for predicting a warped motion of a current block to be encoded can be determined based on warping models of neighbor blocks adjacent to the current block within the video frame. The parameters of a projection model to be used to generate a prediction block can be determined based on the projection samples. The prediction block can then be generated by projecting pixels of the current block to a warped patch within a reference frame using the parameters of the projection model, such that the current block can be encoded or decoded using the prediction block. In some implementations, the warped patch can be a non-rectangular patch having a shape and a position in the reference frame indicated by the parameters of the projection model To summarize, a current block may be predicted according to (e.g., using, etc.) a prediction model that includes or can be described using motion parameters. The prediction model can be a motion vector and the motion parameters can be or can include the horizontal offset and the vertical offset of the motion vector. The prediction model can be a global warping model, and the motion parameters can be or can include global motion parameters of the global warping model. The prediction model can be a local warping model and the motion parameters can be or can include local motion parameters of the local warping model. Other prediction models are possible. The motion parameters can include 2, 4, 6, 9, or other number of parameters, depending on the type of prediction or warping model. As is known, a motion vector or a translational model can be described using 2 parameters; a similarity projection can be described using 4 parameters; an affine projection can be described using 6 parameters; and a homographic projection can be described using 9 parameters.

However, the motion parameters described above may lack the granularity to accurately represent real-world warped motion models of blocks. For example, the motion parameters (e.g., the prediction model) may not be flexible or granular enough to be tailored to (e.g., to fit, exactly model, etc.) the local context of a particular coding block. For example, and as further described below, the local motion parameters used to encode a current block are estimated from the local context (e.g., the reconstructed neighboring blocks) of the current block. As such, as a local warping model of the current block is a derived model that fits the motion in the neighboring blocks of the current block, there can be limitations as to how accurately the local warping model can fit (e.g., match, approximate, etc.) an actual motion model of the block. Similarly, a prediction block obtained using a motion model or a global motion model may not sufficiently accurately fit the actual motion model of a current block.

Implementations according to this disclosure apply a rotation angle to motion parameters of a current block to obtain a prediction block that better matches (e.g., describes, etc.) the current block. By obtaining a prediction block that better matches the current block, the residual error between the current block and the prediction block can be reduced. To encode a current block, an encoder can identify motion parameters and a rotation angle. The encoder can encode the motion parameters and the rotation angle in a compressed bitstream. To decode the current block, a decoder can decode the motion parameters and the rotation angle from the compressed bitstream. The decoder can apply the rotation angle to the motion parameters to obtain a prediction block of the current block.

Further details of warped motion compensation with explicitly signaled extended rotations are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
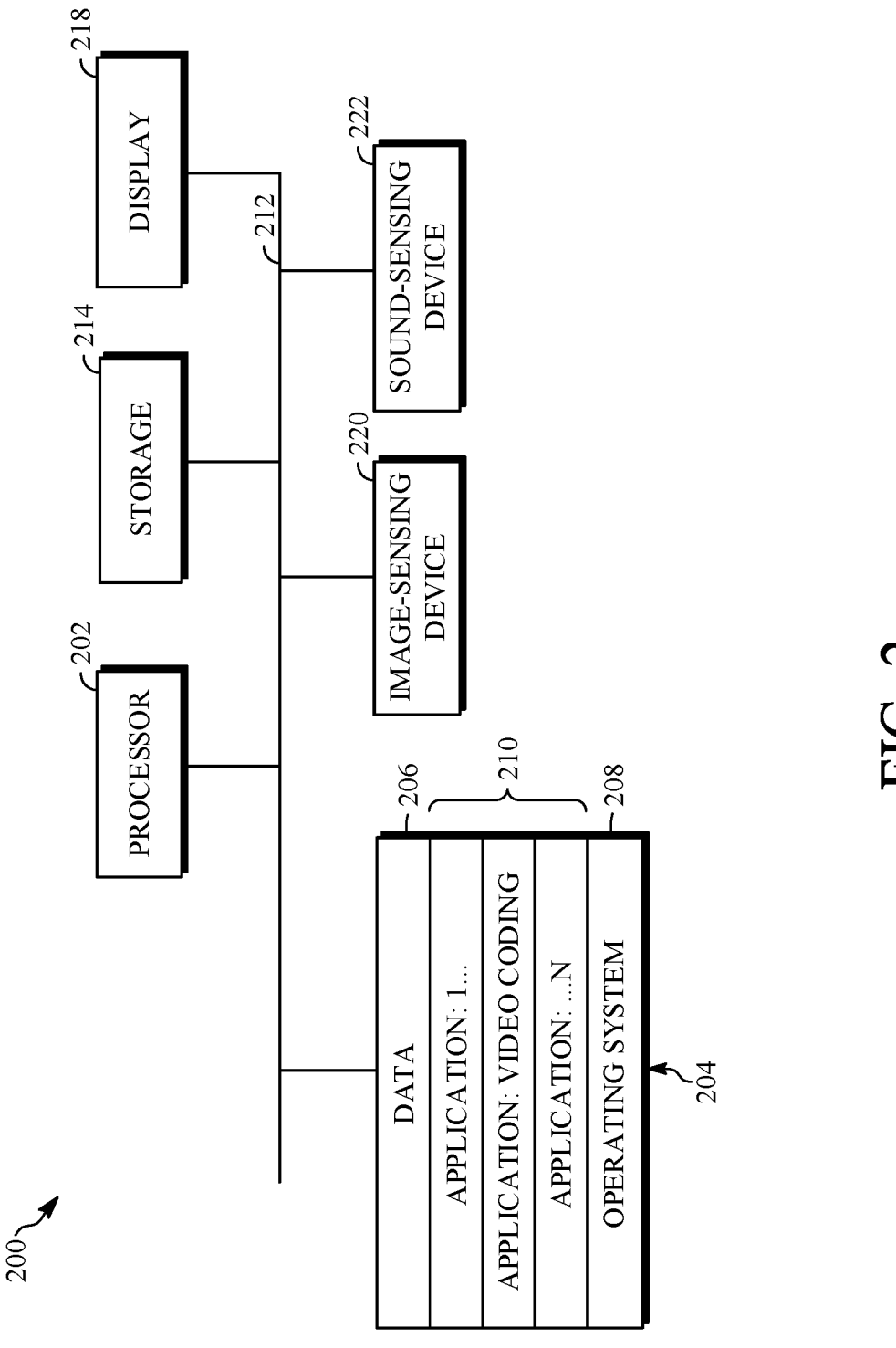
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on the Hypertext Transfer Protocol (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
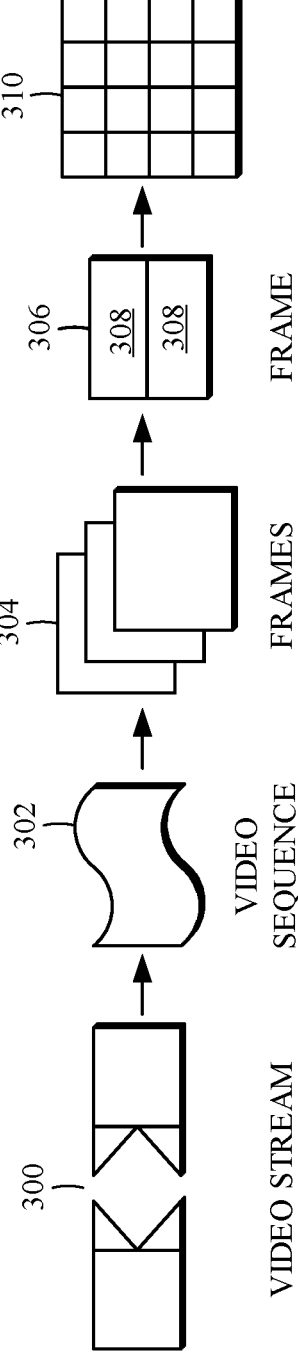
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes multiple adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
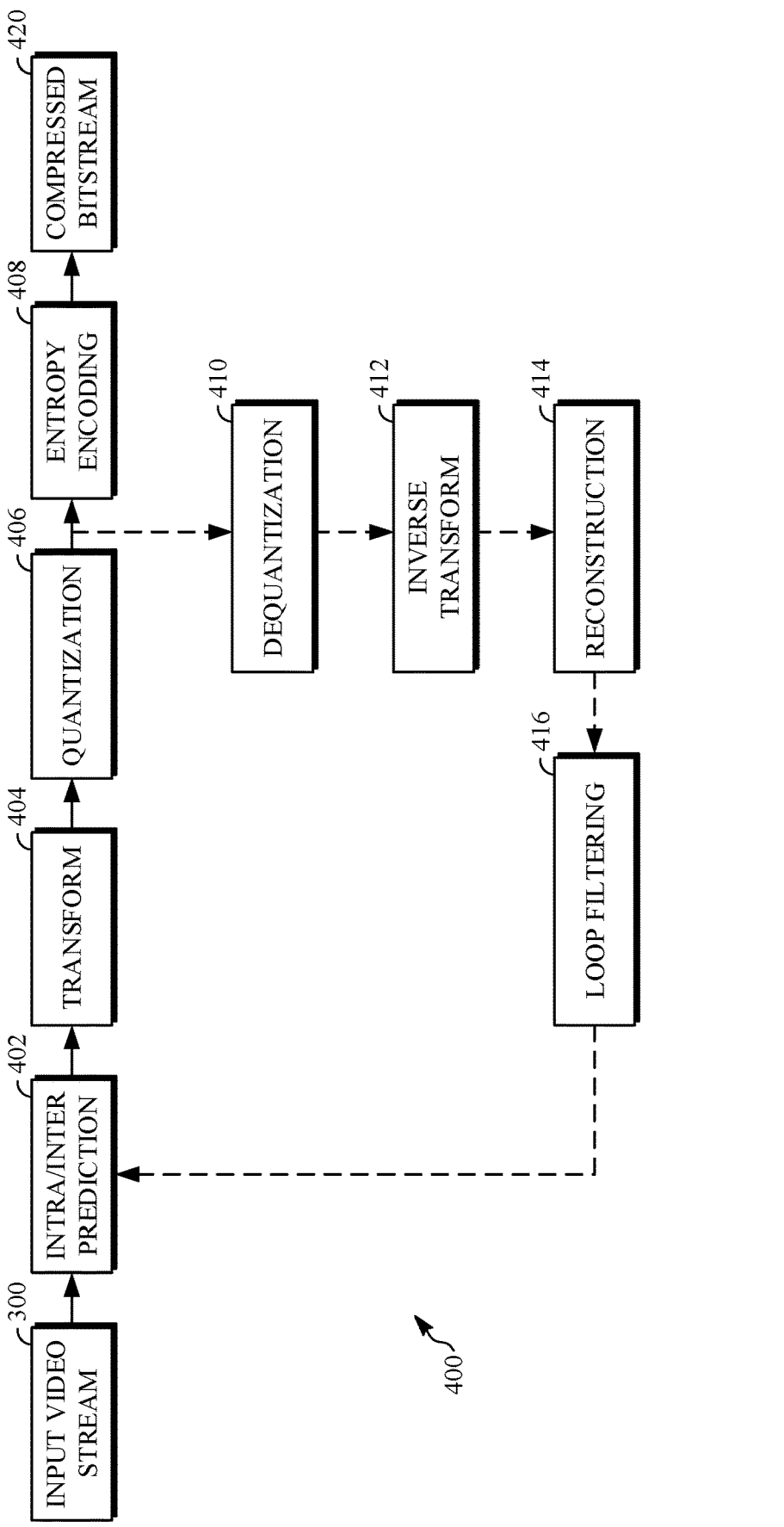
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using warped motion compensation to project pixels of a current block to a warped patch of a reference frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
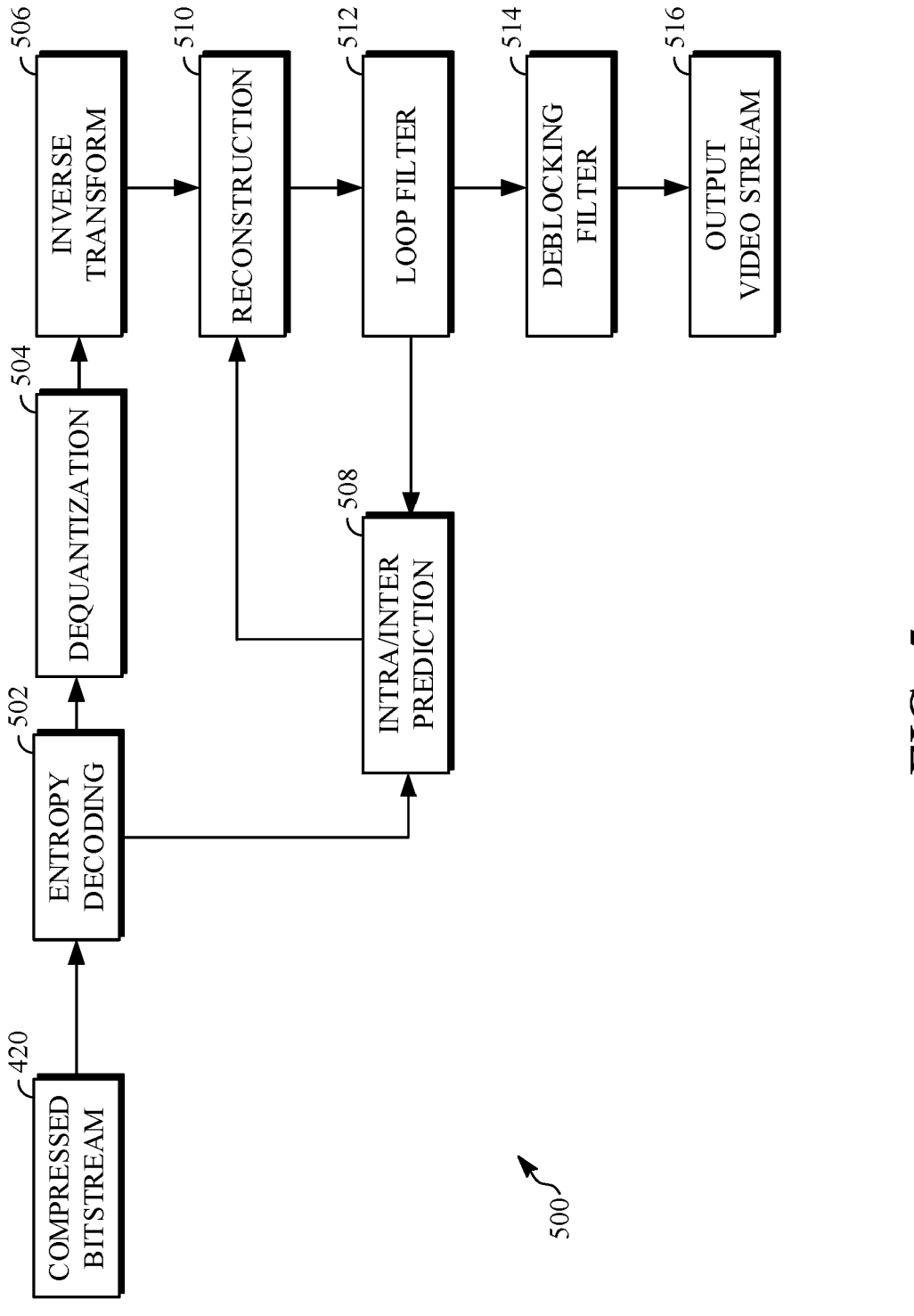
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 are discussed below with respect to FIGS. 6, 7, and 8, for example, using warped motion compensation to project pixels of a current block to a warped patch of a reference frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
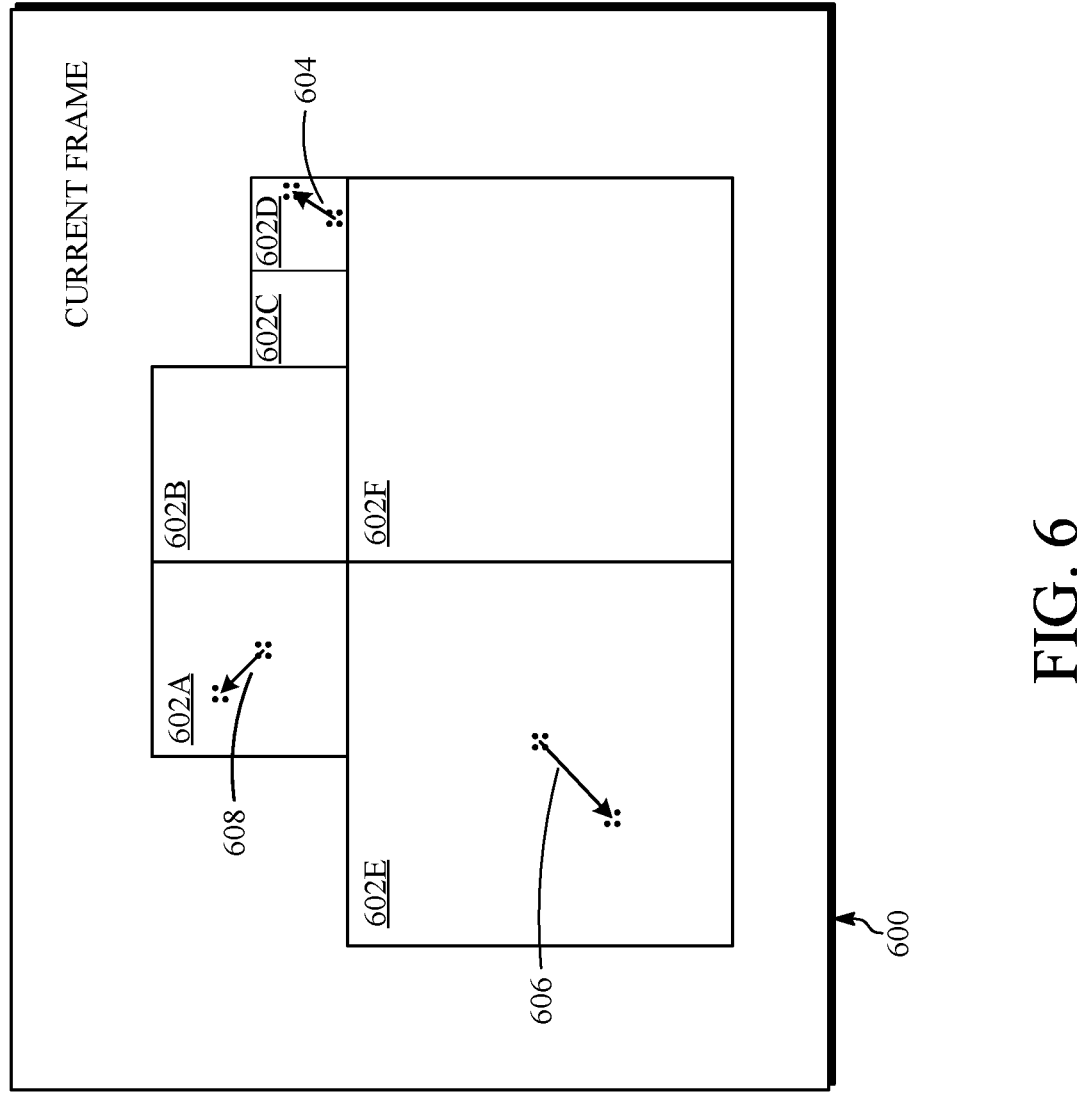
FIG. 6 is a diagram showing an example of pixel projection for blocks of a video frame to be encoded or decoded.

FIG. 6 is a diagram showing an example of pixel projection for blocks of a video frame to be encoded or decoded. A block within a video frame can include warped motion that might not be accurately predicted using motion vectors determined via regular motion compensation (e.g., typical translational inter-prediction). For example, the motion within the block might scale, rotate, or otherwise move in a manner in any number of different directions that are not entirely linear. Regular motion compensation can miss certain portions of the motion falling outside of the rectangular geometry or use an unnecessary number of bits to predict the motion. As such, a prediction block used to encode or decode the block can be formed, or generated, based on a warping model for the block.

Warped motion compensation can be used to encode or decode the block based on projections of pixels of the block to a reference frame. Warped motion compensation may be referred to herein as locally adaptive warped motion compensation as it is performed on smaller regions than on the entire frame, such as on a block basis as described in the examples herein. The projections of the pixels, also referred to as projection samples when describing determining the warped motion of a block, show how pixels of the block scale, rotate, or otherwise move. In some implementations, the projection samples can be estimated using previously encoded or decoded projection samples for one or more from neighbor blocks. However, the previously encoded or decoded projection samples for the one or more neighbor blocks might not clearly indicate the motion within the block to be encoded or decoded. As such, in some implementations, the projection samples for estimating the warped motion of the block to be encoded or decoded can be determined using additional data, such as one or more motion vectors of the block to be encoded or decoded, in concert with the previously encoded or decoded projection samples for the one or more neighbor blocks.

In some implementations, data included in a bitstream can indicate a warping model used to encode or decode a neighbor block of the block to be encoded or decoded. The data indicating the warping model of the neighbor block can further indicate a reference frame used to encode or decode the neighbor block. Because adjacent blocks are more likely to use a common reference frame for prediction in the encoding and decoding processes, it is possible, if not likely, that a neighbor block encoded or decoded before a current block was encoded or decoded using a same reference block as the current block. As such, in some implementations, projection samples used to encode or decode the neighbor block can also be used to encode or decode the block where the block uses the same reference frame as the neighbor block.

For example, and as shown in FIG. 6, a current frame 600 includes blocks 602A, 602B, 602C, 602D, 602E, and 602F. Block 602F is a current block to be encoded and includes some warped motion. Block 602D is a previously encoded neighbor block that includes pixel motion at 604. Block 602E is another previously encoded neighbor block that includes pixel motion at 606. Block 602A is another previously encoded neighbor block that includes pixel motion at 608. In some implementations, the pixel motion shown at 604, 606, 608, or any combination thereof, represents projection samples showing how the pixels of the respective blocks moved responsive to warped motion compensation. For example, with respect to the block 602A, a pre-prediction position of a pixel is shown at the location where the arrow originates, and a post-prediction position of the pixel is shown at the location where the arrow terminates.

A bitstream including data corresponding to the current frame 600 includes information about the warping models used to encode the blocks 602A, 602D, and 602E. On a condition that the prediction of those blocks used a common reference frame as the block 602F, the warping models of the blocks 602A, 602D, and 602E, and therefore the projection samples represented by the motion 604, 606, and 608, can be used to determine a warping model of the block 602F. In some implementations, the pixel position coordinates of the projection samples within the current frame 600 are projected to the common reference frame to identify a non-rectangular warped patch to be used to generate a prediction block for encoding the block 602F. A method for generating a prediction block using such projection samples is discussed with respect to FIG. 8.

In some implementations, neighbor blocks of a block to be encoded or decoded might not have been encoded or decoded using warped motion compensation. In those situations, motion vectors for those neighbor blocks determined via regular motion compensation can be used as the projection samples for determining the warping model of the block to be encoded or decoded. For example, the motion 604, 606, and 608 can represent motion vectors of the blocks 602D, 602E, and 602A, respectively, relative to the reference frame. Those motion vectors can be used to predict a warped motion of the block 602F by similar projection to the reference frame as discussed above.

Figure 7:
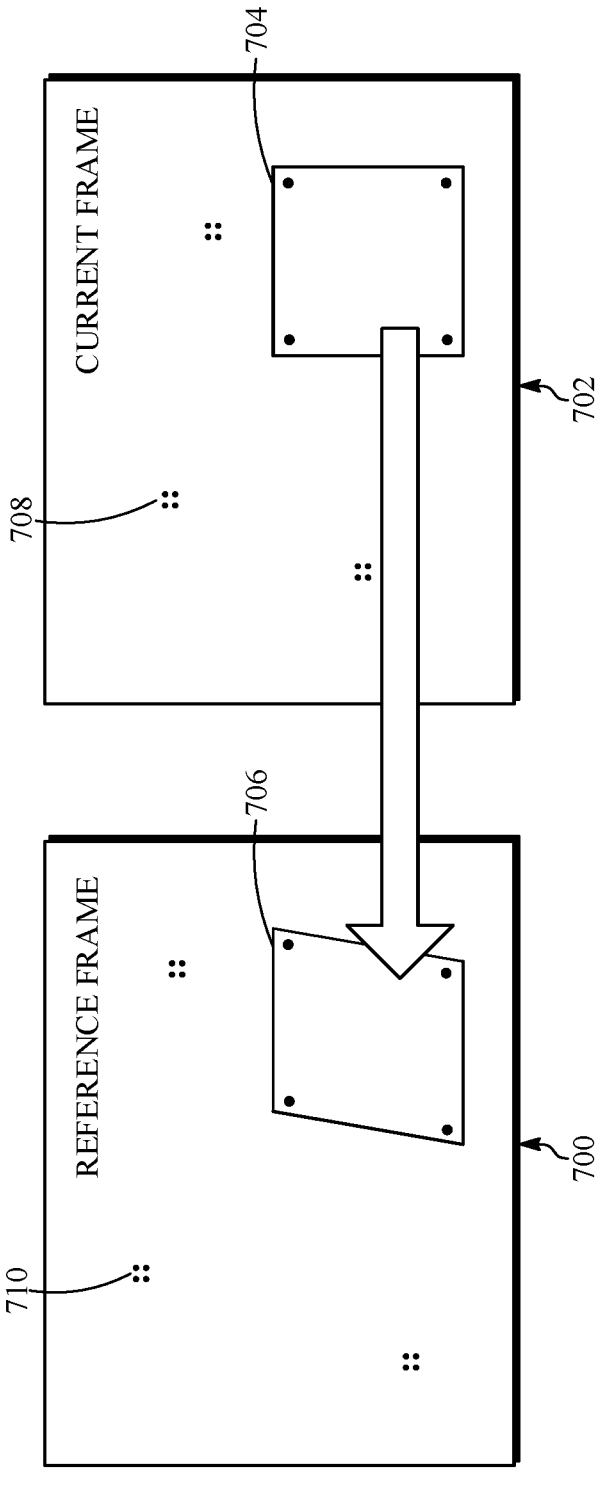
FIG. 7 is a diagram showing an example of warping a block of a video frame using models associated with a reference frame.

FIG. 7 is a diagram showing an example of warping a block of a video frame using models associated with a reference frame 700. FIG. 7 shows the reference frame 700 to which pixels of a current block 704 to be encoded or decoded are projected and a current frame 702 including the current block. The reference frame 700 includes a warped patch 706 representing how the pixels of the current block 704 are projected to the reference frame 700 based on warping models, whose parameters are estimated from projection samples from, e.g., neighbor blocks of the current block 704.

The pixels 708 within the current frame 702 represent pre-prediction positions of pixels shown in the blocks of the current frame 600 of FIG. 6, whereas the pixels 710 within the reference frame 700 represent corresponding post-prediction positions of those pixels. As such, projection samples can be determined based on the pixels 708 and 710. The pixels of the current block 704 are projected to the warped patch 706 based on the projection samples determined using the neighbor blocks of the current block 704 (not shown in FIG. 7).

The warped patch 706 can be used to generate a prediction block for encoding or decoding the current block 704. The pixels of the current block 704 are projected to the warped patch 706 using a projection model indicating how the pixels are to be scaled, rotated, or otherwise moved when projected into the reference frame 700. In some implementations, the projection model to use can be indicated by data associated with the neighbor blocks within an encoded bitstream. The projection samples determined using the neighbor blocks of the current block 704 can be used to determine parameters of the projection model. The number and function of the parameters depend upon the specific projection model to be used. For example, where the projection model is a homographic projection model, eight parameters can be used to show how pixel positions within the current block 704 scale or translate amongst the x- or y-axes. The specific projection model used further determines a possible shape of the warped patch 706. For example, because eight parameters are used with the homographic projection model to represent the x- and y-coordinates of four pixels of the current block 704, the warped patch 706 that corresponds to the current block 704 can be any non-rectangular quadrilateral. However, where an affine projection model is used including six parameters, linearity of the pixel projection is preserved such that the warped patch 706 that results can be any non-rectangular parallelogram, but not any non-rectangular quadrilateral. The warped patch may also be referred to as a warped prediction block herein.

Figure 8:
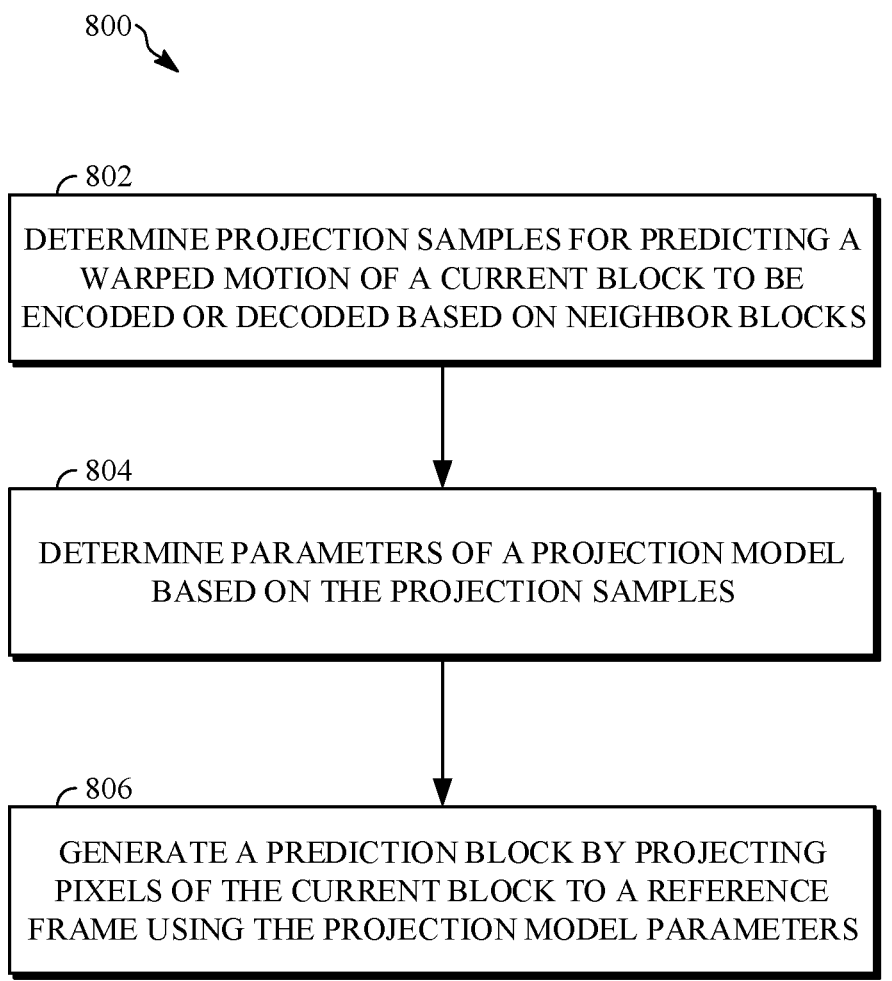
FIG. 8 is a flowchart diagram of a process for generating a prediction block to encode or decode a frame using warped motion compensation.

FIG. 8 is a flowchart diagram of a process 800 for generating a prediction block to encode or decode a frame using warped motion compensation. The process 800 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

At 802, projection samples used to predict a warped motion of a current block to be encoded or decoded are determined. The projection samples are determined based on data associated with neighbor blocks adjacent to the current block that are encoded or decoded before the current block. The projection samples are used to predict a warping model for the current block, wherein the warping model indicates a specific location within a reference frame to which to project the current block, for example, by indicating how to stretch, zoom, rotate, or otherwise manipulate pixels of the current block. The data associated with a neighbor block and used to determine the projection samples can include a warping model indicating how pixels of the neighbor block were warped to generate a prediction block for encoding or decoding the neighbor block. In some implementations, data indicative of the warping model associated with a neighbor block is identified within a bitstream including encoded video data for the neighbor block. The data indicative of the warping model can be stored in a buffer accessible by an encoder or decoder rather than being included in the bitstream.

In some implementations, the neighbor block is encoded or decoded using a same or common reference frame as the reference frame being used to encode or decode the current block. The warping model for the neighbor block can thus indicate the common reference frame. In this situation, one or more pixels corresponding to the pixels of the neighbor block can be selected from the reference frame. The projection samples to be used for predicting a warped motion of the current block can thus be determined based on motion vectors corresponding to the selected pixels of the reference frame. In some implementations, the motion vectors corresponding to the selected pixels of the reference frame are determined based on the locations of the selected pixels of the reference frame and the corresponding pixels of the neighbor block. The projection samples to be used for predicting the warped motion of the current block may also be determined based on motion vectors corresponding to reference frame pixels that corresponding to the pixels of multiple neighbor blocks.

In some implementations, the projection samples used for predicting a warped motion of the current block are determined based on a size of a neighbor block and the efficiency of the warping model used to encode or decode the neighbor block. For example, the warped motion of the current block can be predicted using a weighted average of projection samples from one or more neighbor blocks. The size of a neighbor block can correlate with a degree to which projection samples for the neighbor block influence the average, as a larger number of projection samples can be indicative of a more precise warping model. That is, because a larger neighbor block typically includes a larger number of projection samples than a smaller neighbor block, projection samples from larger neighbor blocks can be given a larger weight when calculating the weighted average than projection samples from smaller neighbor blocks. Separately, the quantized residuals for a neighbor block can indicate an efficiency of the warping model of the neighbor block. For example, smaller values of quantized residuals can indicate a higher precision of a corresponding warping model, so portions of a neighbor block having quantized residuals with small values can be selected to improve the efficiency of the neighbor block for determining the projection samples for the current block.

As mentioned briefly above, one or more neighbor blocks may not be encoded or decoded using warped motion compensation, such that the prediction of those neighbor blocks is performed using regular motion compensation. As such, the warping model of a neighbor block may indicate a motion vector for the neighbor block. The motion vector of the neighbor block can then be used to determine the projection samples for predicting the warped motion of the current block. In some implementations, the projection samples to be used for predicting the warped motion of the current block are determined based on motion vectors from multiple neighbor blocks encoded or decoded using regular motion compensation.

In some implementations, the projection samples to be used for predicting the warped motion of the current block are determined based on a combination of motion vectors from neighbor blocks encoded or decoded using regular motion compensation and selected reference frame pixels corresponding to pixels of neighbor blocks encoded or decoded using warped motion compensation, for example, where the warping model of respective neighbor blocks does not accurately project the pixels of the current block to the reference frame (e.g., because the projection samples determined by those neighbor blocks do not give a full view of the warping motion of the current block). Where the projection samples determined from neighbor blocks encoded or decoded using warped motion compensation are too expensive, motion vector data can be used to determine projection samples for predicting the warping model of the current block to reduce the total cost. For example, if the projection samples determined based on warped motion compensation use more than a threshold amount of memory to be encoded to a bitstream or otherwise communicated for use by other blocks, motion vectors can be used to reduce the overall cost by estimating portions of the projection samples.

At 804, parameters of a projection model are determined based on the projection samples determined at 802. The projection model is a parametric model used to project the pixels of the current block to a portion of a reference frame based on the warped motion predicted using the determined projection samples. In some implementations, the projection model is an affine projection model, a homographic projection model, a rotation-zoom projection model, an interpolation projection model, or the like.

Different projection models can use a different number of parameters to facilitate the projection. For example, an affine projection model can use six parameters to project the pixels of the current block to the reference frame according to the warped motion predicted using the determined projection samples. Generally, an affine projection is a linear transformation between the coordinates of two spaces defined by the six parameters. The affine projection between two spaces is defined as follows:

$$x = a * X + b * Y + c; \text{ and}$$

$$y = d * X + e * Y + f.$$

In these equations, (x, y) and (X, Y) are coordinates of two spaces, namely, a position of a pixel within the reference frame and a position of a pixel within the frame including the current block, respectively. Also, a, b, c, d, e, and f are affine parameters and are real numbers representing a relationship between positions of respective pixels within the reference frame and the frame including the current block. Of these, a and d represent rotational or scaling factors along the x-axis, b and e represent rotational or scaling factors along the y-axis, and c and f respectively represent translation along the x- and y-axes. In that the affine projection model follows a linear transformation, a warped patch to which the pixels of the current block are projected using an affine projection model can be a parallelogram.

In another example, a homographic projection model can use eight parameters to project the pixels of the current block to the reference frame according to the warped motion predicted using the determined projection samples. A homographic projection model is not bound by a linear transformation between the coordinates of two spaces, such that the eight parameters that define a homographic projection can be used to project pixels of a current block to any quadrilateral patch within a reference frame. The homographic projection between two spaces is defined as follows:

$$x = \frac{a * X + b * Y + c}{g * X + h * Y + 1}; \text{ and}$$

$$y = \frac{d * X + e * Y + f}{g * X + h * Y + 1}.$$

In these equations, (x, y) and (X, Y) are coordinates of two spaces, namely, a position of a pixel within the reference frame and a position of a pixel within the frame including the current block, respectively. Further, a, b, c, d, e, f, g, and h are the homographic parameters and are real numbers representing a relationship between positions of respective pixels within the reference frame and the frame including the current block. Of these parameters, a represents a fixed scale factor along the x-axis with the scale of the y-axis remaining unchanged, b represents a scale factor along the x-axis proportional to the y-distance to a center point of the block, c represents a translation along the x-axis, d represents a scale factor along the y-axis proportional to the x-distance to the center point of the block, e represents a fixed scale factor along the y-axis with the scale of the x-axis remaining unchanged, f represents a translation along the y-axis, g represents a proportional scale of factors of the x- and y-axes according to a function of the x-axis, and h represents a proportional scale of factors of the x- and y-axes according to a function of the y-axis.

The values of the parameters for a projection model are determined based on the projection samples determined at 802. In some implementations, the values of the parameters are determined by adding corresponding values of motion vectors of the current block to the projection samples determined using the neighbor blocks.

The projection model to use for projecting the pixels of the current block to the reference frame can be selected based on a projection model used by the one or more neighbor blocks used to determine the projection samples at 802. For example, where most or all of the neighbor blocks are encoded or decoded using a common projection model, the common projection model can be selected as the projection model used to encode or decode the current block. In some implementations, the projection models used to encode or decode respective neighbor blocks is indicated within the encoded bitstream. Alternatively, the projection models can be stored in a buffer accessible by an encoder or decoder rather than being included in the bitstream. In this example, the projection models may be estimated using a plurality of warping models or projection parameters associated with neighbor blocks of the current block. The estimation can indicate parameters usable to generate a least mean square error between actual projection locations for respective pixels and the projections of the estimated projection models. For example, the parameters can be averaged from the projection parameters associated with the neighbor blocks used for the estimating. The model parameters are thus not necessarily transmitted in the bitstream because the encoder and decoder can do the estimation.

At 806, a prediction block is generated using the parameters of the projection model determined at 804. Pixels of the current block to be encoded or decoded are projected to a warped patch in a reference frame using the parameters of the projection model. Before the projection, respective pixels of the current block are arranged in generally rectangular geometries. Responsive to the projection, the respective pixels of the current block are warped to correspond to a geometry of the warped patch in the reference frame.

In some implementations, the pixels of the current block are projected to the warped patch according to the projection model discussed at 804. The parameters for the projection model are determined based on the projection samples determined at 802 such that coordinates to which to project pixels of the current block within the reference frame can be determined. The warped patch of the reference frame can be a parallelogram or other non-rectangular quadrilateral, depending on the projection model and corresponding parameter values used.

The warped patch can then be unwarped to return the current block to a rectangular geometry suitable for predicting the current block. For example, unwarping the projected pixels of the warped patch after respective pixels are projected to the warped patch of the reference frame can include projecting the warped patch to a rectangular block. The pixel position coordinates of the warped patch of the reference frame can be projected to the rectangular block based on respective coordinate translations to the rectangular block. The resulting rectangular block can then be used as the prediction block for encoding or decoding the current block.

In another example, pixel values at positions of the warped patch can be copied to corresponding positions within a rectangular block usable for predicting the current block. The pixel values of the warped patch can be copied from the reference frame into the rectangular block using an intermediary buffer. Where the copied pixel values of the warped patch are not represented using integers, pixel interpolation may be used to determine integer values for the copied pixel values (e.g., by approximating the pixel values at subpixel locations).

In an implementation, the process 800 can additionally include an operation for generating an alternate prediction block and performing a rate-distortion analysis to select one of the prediction block or the alternate prediction block as a final prediction block for encoding or decoding the current block. For example, the alternate prediction block can be generated based on a non-warped motion compensation. In this case, the alternate prediction block can be generated using regular motion compensation based on motion vectors for respective pixels of the current block. Alternatively, the alternate prediction block can be generated using a warping model different from the warping model used to determine the projection samples for predicting the warped motion of the current block. In another alternative, the alternate prediction block can be generated using an alternate projection model different from the projection model used based on the determined projection samples. According to the teachings herein, multiple candidate alternate prediction blocks can be generated such that the final prediction block used to encode or decode the current block is selected from the prediction block and the multiple candidate alternate prediction blocks. In some cases, different candidate alternate prediction blocks can be generated based on different reference frames. The rate-distortion analysis to select the final prediction block can be performed by comparing the rate-distortion values for respective candidate prediction blocks such that the final prediction block is selected as the candidate prediction block having the lowest rate-distortion value.

In another example, the process 800 additionally includes one or more operations for encoding or decoding the current block using a prediction block. In some implementations, encoding the current block using the prediction block includes transforming the values for the pixels of the prediction block, quantizing the transformed pixel values, entropy encoding the quantized pixel values, and encoding the entropy encoded pixel values to generate an encoded bitstream. Decoding the current block using the prediction block can include entropy decoding pixel values for the encoded current block received from an encoded bitstream, dequantizing the entropy decoded pixel values, inverse transforming the dequantized pixel values, and reconstructing the current block using the prediction block.

Figure 9:
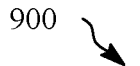
FIG. 9 is a flowchart diagram of a process for generating a prediction block to encode or decode a current block of a frame.
Figure 9:
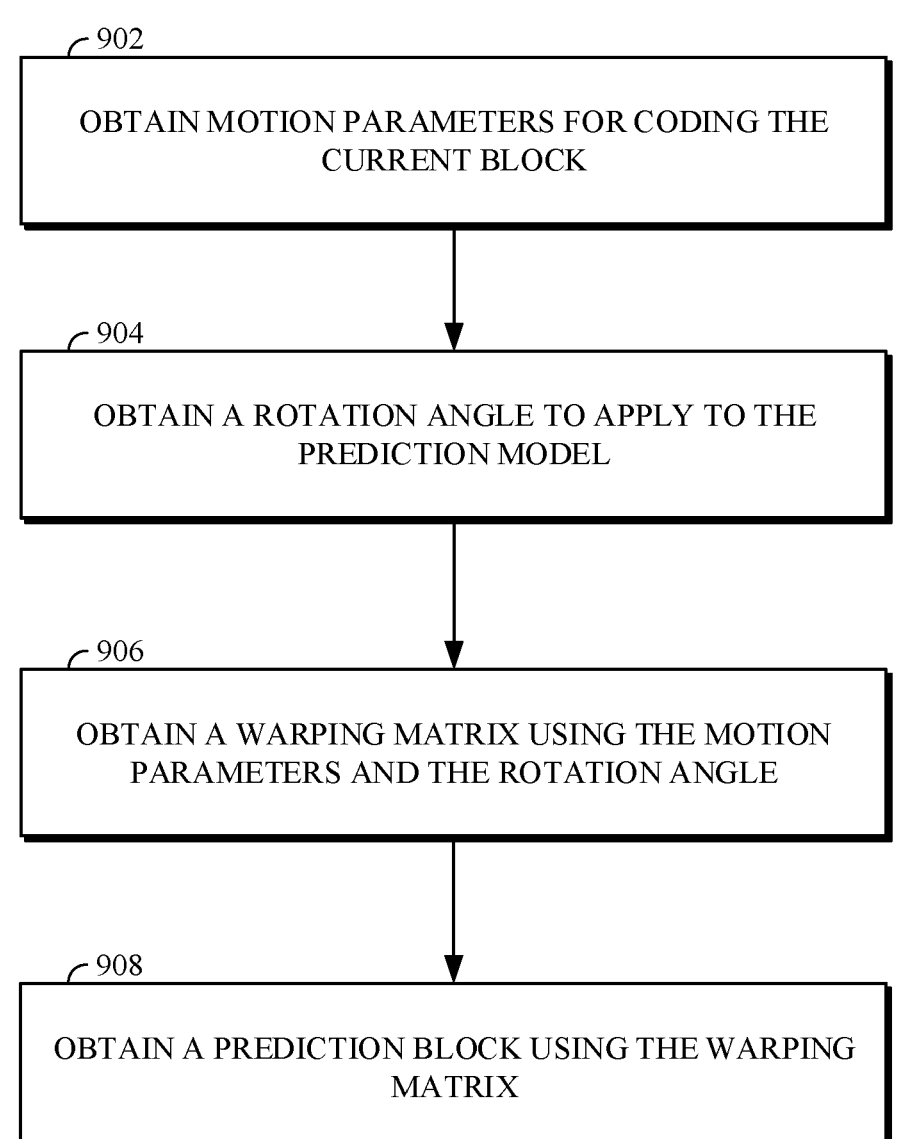

FIG. 9 is a flowchart diagram of a process 900 for generating a prediction block to encode or decode a current block of a current frame. The process 900 can be implemented, for example, as a software program that may be executed by computing devices such as the transmitting station 102 or the receiving station 106 of FIG. 1. For example, the software program can include machine-readable instructions that may be stored in a memory such as the memory 204 or the secondary storage 214 of FIG. 2, and that, when executed by a processor, such as CPU 202 of FIG. 2, may cause the computing device to perform the process 900. The process 900 can be implemented using specialized hardware or firmware. As explained above, some computing devices may have multiple memories or processors, and the operations described in the process 900 can be distributed using multiple processors, memories, or both. The process 900 can be implemented using specialized hardware or firmware. Multiple processors, memories, or both, may be used.

The process 900 may be implemented in whole or in part in the intra/inter prediction stage 402 of the encoder 400 of FIG. 4 and/or the intra/inter prediction stage 508 of the decoder 500 of FIG. 5. When implemented in an encoder, "to code" means "to encode;" when implemented by a decoder, "to code" means "to decode."

At 902, the process 900 obtains motion parameters for coding the current block. The motion parameters can include a horizontal offset and a vertical offset of a motion vector. The motion parameters can include parameters of a global motion model of a reference frame. The motion parameters can include parameters of a local warping model. Motion parameters of a local warping model are referred to as local warping parameters. The local warping parameters can be obtained using reconstructed neighboring blocks of the current block, as described herein. Motion parameters of a global warping model or of a local warping model are referred to as warping parameters. In an example, the process 900 determines whether to predict the current block using a motion vector, a local warping model, or a global motion model.

When implemented in an encoder, the process 900 can obtain the motion parameters by determining a best prediction model for encoding the current block. The prediction model includes specific motion parameters (i.e., values of the motion parameters). Several tools or techniques may be available in the encoder to determine the best prediction model. A best prediction model can be the one prediction model from amongst several that results in the lowest rate-distortion value, the lowest prediction error, or the like. Other ways of determining the best (e.g., optimal) prediction model are possible.

The process 900 can encode the motion parameters in a compressed bitstream, such as the compressed bitstream 420 of FIG. 4. For example, in the case of a motion vector, the process 900 can encode data in the compressed bitstream that a decoder can decode to obtain the motion vector. For example, in the case of a global motion model, the process 900 can encode reference-frame-level parameters of the motion model. For example, in the case of an affine motion model, the encoder can encode parameters (a, b, c, d, e, f), which can be as described above with respect to formula (1). More or fewer parameters can be encoded depending on the type of warped motion model. For example, in the case of a local warping model, the process 900 can encode motion parameters as described above.

When implemented in a decoder, the process 900 can obtain the motion parameters by decoding or inferring at least a subset of the motion parameters from an encoded bitstream, such as the compressed bitstream 420 of FIG. 5. In an example, the motion parameters can include an indication that a local warping model is to be derived using reconstructed neighboring blocks of the current block. For example, the compressed bitstream can include one or more syntax elements that the process 900 can use to determine to perform a warping operation according to a local warping model.

For example, with respect to a motion vector, the process 900 may decode the motion vector offsets from the compressed bitstream; may decode differential values of offsets of the motion vector, which may be added to the offsets of another motion vector to obtain the motion vector offsets; may decode an index of a motion vector candidate in a motion vector candidate list; may decode a syntax element that indicates that the motion vector of another block is to be used for the current block; or may obtain the motion vector offsets in some other way. With respect to a global motion model, the process 900 can decode the motion parameters encoded by the encoder. With respect to a local warping model, the process 900 can decode the motion parameters as described herein. As such, the process 900 may decode one or more values that can be used to obtain the motion parameters, as described herein.

At 904, the process 900 obtains (e.g., selects, calculates, determines, chooses, etc.) a rotation angle to apply to the motion parameters. That is, the process 900 uses the rotation angle to apply an extra rotation to (e.g., on top of, etc.) the prediction model. The rotation angle is measured with respect to an axis, which may be the horizontal axis, the vertical axis, or some other axis.

When implemented by an encoder, the process 900 can perform a search for an optimal rotation angle in a range of rotation angles. That is, the process 900 may obtain respective prediction blocks corresponding to at least some of the rotation angles in the range of rotation angles and select the rotation angle corresponding to a best rate-distortion value, a minimal prediction error, or some other measure. In an example, the range of rotation angles can include a range [−8°, +8°]. In an example, the range of rotation angles can include the angles [0°, 360°]. However, other ranges are possible, and the range may be a subset of the range [0°, 360°]. The at least some of the angles in the range of rotation angles can be selected from the range according to a step size. The step size can be 0.25°, 0.5°, 1°, 5°, 10°, or some other step size value. To illustrate, assuming that the step size is 2, then the rotation angles −8°, −6°, −4°, −2°, etc. can be the at least some of the angles in the range [−8°, +8°].

The process 900 can encode the obtained rotation angle in the compressed bitstream. In an example, the process 900 can encode the rotation angle itself. In an example, the process 900 can encode an index of the angle in the range. To illustrate, in the range [−8°, +8°], and assuming a step size of 1, −8° may correspond to an index of 0; −7° may correspond to an index of 1; and so on. In an example, the process 900 can also encode, prior to encoding the rotation angle, a syntax element (e.g., a flag) that indicates whether the compressed bitstream includes a rotation angle. If the flag has a first value (e.g., 1), then a decoder can decode the rotation angle from the compressed bitstream. If the flag has a second value (e.g., 0), then the compressed bitstream does not include a rotation angle. In an example, the process 900 may not encode a rotation angle that is equal to 0. In an example, the rotation angle may be entropy encoded. However, other ways of writing (e.g., encoding) the rotation angle to the compressed bitstream are available.

When implemented by a decoder, the process 900 can obtain the rotation angle by decoding the rotation angle from the compressed bitstream. In an example, the process 900 can decode the value of the rotation angle itself. In an example, the process 900 can decode an index of the rotation angle. The process 900 can obtain the rotation angle from the index. The decoder may first decode the syntax element that indicates whether the process 900 is to obtain the rotation angle from the compressed bitstream. In an example, the rotation angle may be entropy decoded. However, other ways of reading (e.g., decoding) the rotation angle from the compressed bitstream are available.

At 906, the process 900 obtains a warping matrix using the motion parameters and the rotation angle.

In the case that the prediction model is a warping model (e.g., a global motion model or a local warping model), the warping matrix can be obtained using formula (2).

$$WM = MP * TR = \begin{bmatrix} a & b & c \\ d & e & f \\ 0 & 0 & 1 \end{bmatrix} * \tag{2}$$

$$\begin{bmatrix} \cos(\theta) & -\sin(\theta) & -x_c\cos(\theta) + y_c\sin(\theta) + x_c \\ \sin(\theta) & \cos(\theta) & -x_c\sin(\theta) - y_c\cos(\theta) + y_c \\ 0 & 0 & 1 \end{bmatrix}$$

The warping matrix (WM) can be obtained by multiplying a matrix of the motion parameters (MP) (also referred to as an "original warping matrix") by a transformation and rotation matrix (TR) (also referred to simply as a "rotation matrix"). Formula (2) assumes an affine warping model (i.e., motion parameters a, b, . . . , f). However, as mentioned above, the motion parameters can include more or fewer parameters. $\theta$ is the rotation angle, and $(x_c, y_c)$ are the coordinates of the center point of the current block. Multiplying the matrix of the motion parameters (MP) by the transformation and rotation matrix (TR) results in the warping matrix (WM) of formula (3). Again, the warping matrix can be obtained by multiplying the original warping matrix and the rotation matrix.

$$WM = \begin{bmatrix} a\cos(\theta) + & -a\sin(\theta) + & (ay_c - bx_c)\sin(\theta) + \\ b\sin(\theta) & b\cos(\theta) & (ax_c + by_c)(1 - \cos(\theta)) + \\ & & c \\ d\cos(\theta) + & -d\sin(\theta) + & (dy_c - ex_c)\sin(\theta) + \\ e\sin(\theta) & e\cos(\theta) & (dx_c + ey_c)(1 - \cos(\theta)) + \\ & & f \\ 0 & 0 & 1 \end{bmatrix} \tag{3}$$

In the case that the prediction model is a motion vector, the warping matrix can be obtained using formula (4), which converts the motion vector to a translational matrix (TM) and multiplies the translational matrix (TM) by a rotation matrix (TR) that is similar to the rotation matrix (TM) described above.

$$WM = TM * TR = \begin{bmatrix} 1 & 0 & T_x \\ 0 & 1 & T_y \\ 0 & 0 & 1 \end{bmatrix} * \tag{4}$$

$$\begin{bmatrix} \cos(\theta) & -\sin(\theta) & -x_c\cos(\theta) + y_c\sin(\theta) + x_c \\ \sin(\theta) & \cos(\theta) & -x_c\sin(\theta) - y_c\cos(\theta) + y_c \\ 0 & 0 & 1 \end{bmatrix}$$

In the translational matrix (TM), $T_x$ and $T_y$ correspond to a horizontal offset and a vertical offset, respectively. In an example, $T_x$ can be the horizontal offset $MV_x$ of the motion vector and $T_y$ can be the vertical offset $MV_y$ of the motion vector. In an example, the motion vector may be specified in, or have, a fractional pixel motion vector accuracy, q. In such a case, the motion vector components can be converted to integer pixel values. That is, the precision of the motion vector can be changed to an integer precision for use in the translational matrix. As such, $T_x=q*MV_x$ and $T_y=q*MV_y$. For example, if $q=\frac{1}{8}$, then $T_x=MV_x/8$ and $T_y=MV_y/8$.

At 908, the process 900 obtains a prediction block using the warping matrix. The process 900 warps the reference frame according to the warping matrix. The current block is projected to a quadrilateral in the reference frame using the warping matrix. That is, pixels of the current block can be predicted as respective values of pixels at projected positions in the quadrilateral patch. For example, given a pixel at a location $(x_i, y_i)$ of the current block, the projected pixel $(x'_i, y'_i)$ of the prediction block can be determined using equation (5). In Equation (5), $(x_i, y_i)$ and $(x'_i, y'_i)$ can be coordinates in a coordinate system using any point as the center (i.e., origin). In one example, the origin can be the center of the current block, which can also be the center of rotation and/or zoom.

$$\begin{bmatrix} x'_i \\ y'_i \\ 1 \end{bmatrix} = WM \begin{bmatrix} x_i \\ y_i \\ 1 \end{bmatrix} \tag{5}$$

As described with respect to FIG. 4, when the process 900 is implemented in an encoder, a residual block can be obtained by subtracting the prediction block from the current block. The residual block can be encoded in the compressed bitstream. As described with respect to FIG. 5, when the process 900 is implemented in a decoder, the residual block can be decoded from the compressed bitstream and added to the prediction block to obtain the current block.

Figure 10:
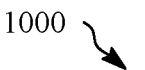
FIG. 10 is a flowchart diagram of a process for decoding a current block.
Figure 10:
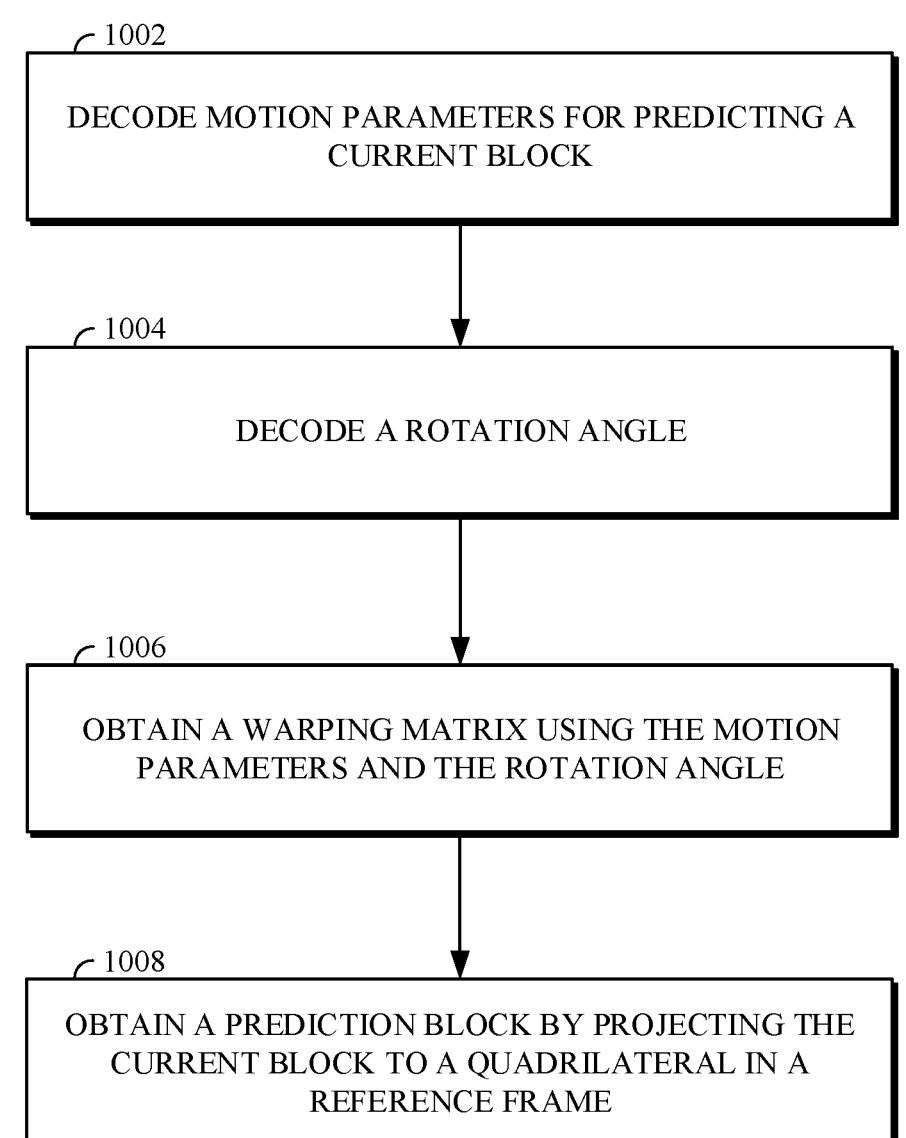

FIG. 10 is a flowchart diagram of a process 1000 for decoding a current block. The process 1000 can be implemented, for example, as a software program that may be executed by computing devices such as transmitting station 102 or receiving station 106 of FIG. 1. For example, the software program can include machine-readable instructions that may be stored in a memory such as the memory 204 or the secondary storage 214 of FIG. 2, and that, when executed by a processor, such as CPU 202 of FIG. 2, may cause the computing device to perform the process 1000. The process 1000 can be implemented using specialized hardware or firmware. As explained above, some computing devices may have multiple memories or processors, and the operations described in the process 1000 can be distributed using multiple processors, memories, or both. The process 1000 can be implemented using specialized hardware or firmware. Multiple processors, memories, or both, may be used. The process 1000 may be implemented in whole or in part in the intra/inter prediction stage 508 of the decoder 500 of FIG. 5.

At 1002, the process 1000 decodes, from a compressed bitstream, motion parameters for predicting the current block. Decoding the motion parameters can be as described with respect to 902 of FIG. 9 in the case that the process 900 is implemented by a decoder. The motion parameters can include a motion vector. The motion parameters can include global motion parameters associated with a reference frame. The motion parameters can include an indication (e.g., one or more syntax elements indicating) that a local warping model is to be derived using reconstructed neighboring blocks of the current block.

At 1004, the process 1000 decodes, from the compressed bitstream, a rotation angle. Decoding the rotation angle can be as described with respect to 904 of FIG. 9 in the case that the process 900 is implemented in a decoder. In an example, the rotation angle can be selected from a range that is a subset of the range of angles $[0°, 360°]$. For example, the rotation angle can be in a range of $-8$ degrees to $+8$ degrees.

At 1006, the process 1000 obtains a warping matrix using the rotation angle. Obtaining the warping matrix can be as described with respect to FIG. 9.

In an example, obtaining the warping matrix using the motion parameters and the rotation angle can include, as described above, converting the motion vector to a translational matrix; obtaining a rotation matrix using the rotation angle; and multiplying the rotation matrix and the translational matrix to obtain the warping matrix. In an example, converting the motion vector to the translational matrix can include changing a precision of the motion vector to an integer precision for use in the translational matrix.

In an example, obtaining the warping matrix using the motion parameters and the rotation angle can include, as described above, obtaining warping parameters; obtaining an original warping matrix using the warping parameters; obtaining a rotation matrix using the rotation angle; and multiplying the original warping matrix and the rotation matrix to obtain the warping matrix.

At 1008, the process 1000 obtains a prediction block by projecting the current block to a quadrilateral in a reference frame, as described above.

For simplicity of explanation, the processes 800, 900, and 1000 of FIGS. 8, 9, and 10, respectively, are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor processor (that is, the computer-readable medium can be a non-transitory computer-readable storage medium). The medium can be, for example, an electronic, magnetic, optical, electromagnetic, or a semiconductor device. Other suitable mediums are also available.

The above-described embodiments, implementations and aspects have been described to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for decoding a current block, comprising:
obtaining motion parameters for predicting the current block;
decoding, from a compressed bitstream, a rotation angle that is explicitly signaled to apply additional rotation to the motion parameters and is separate from the motion parameters;

obtaining a warping matrix by applying the rotation angle to the motion parameters to extend motion compensation beyond a granularity provided by the motion parameters alone; and
obtaining, using the warping matrix, a prediction block by projecting the current block to a quadrilateral in a reference frame.

2. The method of claim 1, wherein the motion parameters comprise a motion vector.

3. The method of claim 2, wherein obtaining the warping matrix using the motion parameters and the rotation angle comprises:
converting the motion vector to a translational matrix;
obtaining a rotation matrix using the rotation angle; and
multiplying the rotation matrix and the translational matrix to obtain the warping matrix.

4. The method of claim 3, wherein converting the motion vector to the translational matrix comprises:
changing a precision of the motion vector to an integer precision for use in the translational matrix.

5. The method of claim 1, wherein the motion parameters comprise global motion parameters associated with the reference frame.

6. The method of claim 1, wherein the motion parameters comprise an indication that a local warping model is to be derived using reconstructed neighboring blocks of the current block.

7. The method of claim 6, wherein obtaining the warping matrix using the motion parameters and the rotation angle comprises:
obtaining warping parameters;
obtaining an original warping matrix using the warping parameters;
obtaining a rotation matrix using the rotation angle; and
multiplying the original warping matrix and the rotation matrix to obtain the warping matrix.

8. The method of claim 1, wherein the rotation angle is selected from a range that is a subset of [0°, 360°].

9. A computing device for decoding a current block of a current frame, comprising:
a processor configured to:
determine a prediction model of the current block, wherein the processor is configured to determine the prediction model by steps to:
determine whether to predict the current block using a motion vector, a local warping model, or a global motion model;
obtain motion parameters of the prediction model;
decode, from a compressed bitstream, a rotation angle that is explicitly signaled to apply additional rotation to the motion parameters and is separate from the motion parameters;
obtain a warping matrix by applying the rotation angle to the motion parameters to extend motion compensation beyond a granularity provided by the motion parameters alone; and
obtain, using a warping matrix, a prediction block by projecting the current block to a quadrilateral in a reference frame.

10. The computing device of claim 9, wherein to obtain the motion parameters of the prediction model comprises to:
obtain, using reconstructed neighboring blocks of the current frame, local warping parameters of the local warping model.

11. The computing device of claim 9, wherein to decode, from the compressed bitstream, the rotation angle comprises to:

decode from the compressed bitstream an index indicative of the rotation angle.

12. A non-transitory computer-readable storage medium comprising instructions that, when executed by a processor, perform operations for coding a current block, comprising:

obtaining motion parameters for coding the current block;

obtaining a rotation angle to apply to the motion parameters that is explicitly signaled in a compressed bitstream, the rotation angle is applied as additional rotation to the motion parameters and is separate from the motion parameters;

obtaining a warping matrix by applying the rotation angle to the motion parameters to extend motion compensation beyond a granularity provided by the motion parameters alone; and obtaining, using the warping matrix, a prediction block using the warping matrix.

13. The non-transitory computer-readable storage medium of claim 12, wherein the motion parameters comprise offsets of a motion vector.

14. The non-transitory computer-readable storage medium of claim 12, wherein the motion parameters comprise parameters of a global motion model of a reference frame.

15. The non-transitory computer-readable storage medium of claim 12, wherein the motion parameters comprise parameters of a warping model obtained using reconstructed neighboring blocks of the current block.

16. The non-transitory computer-readable storage medium of claim 12, wherein obtaining the rotation angle to apply to the motion parameters comprises:

decoding the rotation angle from a compressed bitstream.

17. The non-transitory computer-readable storage medium of claim 12, wherein obtaining the rotation angle to apply to the motion parameters comprises:

selecting the rotation angle from a range of rotation of angles.

18. The non-transitory computer-readable storage medium of claim 17, wherein the range of rotation of angles comprises angles in a range that is a subset of [0°, 360°].

19. The non-transitory computer-readable storage medium of claim 17, further comprising:

encoding an index of the rotation angle in a compressed bitstream.

20. The computing device of claim 9, wherein to obtain the motion parameters of the prediction model comprises to: responsive to determining to predict the current block using the motion vector, decode the motion vector from the compressed bitstream; and wherein to obtain the warping matrix using the motion parameters and the rotation angle comprises to:

convert the motion vector to a translational matrix;

obtain a rotation matrix using the rotation angle; and multiply the rotation matrix and the translational matrix to obtain the warping matrix.

* * * * *